United States Patent [19]
Iwasaki et al.

[11] Patent Number: 5,134,357
[45] Date of Patent: Jul. 28, 1992

[54] DC VOLTAGE CONVERTING DEVICE

[75] Inventors: Shinichiro Iwasaki; Motonobu Akagi; Nobuyuki Oota; Yasutoshi Yamada, all of Aichi, Japan

[73] Assignee: Aisin Seiki K.K., Aichi, Japan

[21] Appl. No.: 500,832

[22] Filed: Mar. 29, 1990

[30] Foreign Application Priority Data

Mar. 31, 1989 [JP] Japan .................. 1-082272

[51] Int. Cl.$^5$ .................. G05F 1/613; H02M 3/335
[52] U.S. Cl. .................. 323/222; 323/285; 363/71
[58] Field of Search .................. 323/222, 282, 284, 285, 323/286, 287; 363/20, 21, 97

[56] References Cited

U.S. PATENT DOCUMENTS

| | | | |
|---|---|---|---|
| 4,403,279 | 9/1983 | Hirsch et al. | 323/222 |
| 4,683,529 | 7/1987 | Bucher, III | 323/222 |
| 4,792,887 | 12/1988 | Bernitz et al. | 323/222 |
| 4,814,684 | 3/1989 | McCurdy | 323/222 |
| 4,837,495 | 6/1989 | Zansky | 323/222 |

Primary Examiner—Peter S. Wong
Attorney, Agent, or Firm—Sughrue, Mion, Zinn Macpeak & Seas

[57] ABSTRACT

A DC voltage converting device having a choke coil, a switching device, a capacitor for accumulating electric energy, an inhibition setting device for setting and releasing an inhibition of charging, a current detecting device for detecting a charge current of the choke coil, a charge/discharge setting device for setting a discharge of the choke coil, and a driving device for conductively energizing the switching device. Based on this construction, when a capacitor voltage exceeds a predetermined voltage, only a time for interrupting the charge is extended.

1 Claim, 7 Drawing Sheets

To; set by reference tilt voltage(=constant value)
T1,T2,T3,...controlled to make residual current have a target value
Tc; set by charge timer (=constant value)

DC VOLTAGE CONVERTING DEVICE

BACKGROUND OF THE INVENTION

The present invention is directed generally to a DC voltage converting device for converting a DC voltage, and more particularly, to a DC voltage converting device for effecting a conversion from a relatively low DC power supply into a higher DC voltage.

The DC voltage converting device, i.e., a DC—DC converter, is employed for obtaining plural kinds of DC voltages. One typical example may be a DC—DC converter reported on p. 311 of Practical Electronic Circuit Handbook (published by CQ Publishing Co., Ltd), which is depicted in FIG. 5.

This type of DC—DC converter defined as a fundamental flyback type power supply circuit is composed of a charge coil L, transistors Tr2 and Tr3, resistors r1 to r3, capacitors c1 and c2, a diode DD and a Zener diode ZD.

Based on this construction, the charge coil L, the transistor Tr1, the resistors r1 and r2 and the capacitor c1 are combined to contitute an oscillation circuit. The transistor Tr2 is used as a switching element for controlling a charge and a discharge of the charge coil L. More specifically, when turning ON the transistor Tr2, the charge coil L is charged with a charge current i1 flowing therethrough. Whereas in the case of turning OFF the transistor Tr2, a discharge current i2 flows via the diode DD and is charged in the capacitor c2. An output voltage is stepped up by repeating such operations. If the voltage exceeds a voltage of the Zener diode ZD, however, feedback is applied to the transistor Tr3, with the result that a bias voltage of the transistor Tr2 is bypassed to stop the oscillations. Consequently, the capacitor c2 is charged with no electricity, and the output is reduced. When the output voltage is decreased under the voltage of the Zener diode ZD, the oscillations resume. It is therefore possible to obtain an output voltage substantially equal to the voltage of the Zener diode ZD.

In the above-described DC—DC converter, when the output voltage exceeds the voltage of the Zener diode ZD, the oscillations cease. Whereas if lower than the Zener diode voltage, the oscillations resume. The output voltage is thus kept to a constant value. At that time, however, the Zener diode ZD and the transistors Tr1 and Tr2 come into a linear region, which in turn causes parasitic oscillations due to noise components and a heat emission or a heat breakdown of the transistor Tr2. To prevent these phenomena, a capacitor CC for a filter may be interposed in a voltage feedback loop. This arrangement has, however, proven ineffective because of a deterioration of respondency to fluctuations in the output voltage.

SUMMARY OF THE INVENTION

It is a primary object of the present invention, which has devised to obviate the foregoing defects inherent in the prior arts, to provide a novel DC voltage converting device capable of exhibiting a high efficiency, stability and respondency.

To accomplish this object, according to one aspect of the present invention, there is provided a DC voltage converting device comprising: a choke coil; a switching means for supplying/breaking a charge current of the choke coil; a capacitor for accumulating electric energy discharged from the choke coil; an inhibition setting means for setting an inhibition of charging when a voltage of the capacitor is greater than a predetermined voltage and releasing the inhibition when being lower than the predetermined voltage; a current detecting means for detecting a charge current of the choke coil; a charge/discharge setting means for setting a discharge of the choke coil when the charge current reaches a predetermined value, setting a charge of the choke coil after a predetermined time has passed if the inhibition of charging is thereafter released until the predetermined time passes, and setting the charge of the choke coil at least after releasing the inhibition of charging if the charging inhibition has been set; and a driving means for conductively energizing the switching means during setting of charge and deenergizing the switching means during setting of discharge.

With this arrangement, when the capacitor voltage exceeds the predetermined voltage, only a period for halting the electrification is extended. To be more specific, an ON/OFF cycle of the switching means is greater than a given cycle, and the oscillations in the linear region of the switching means do not cease. It is therefore feasible to prevent both parasitic oscillations due to noise components and a heat emission or heat breakdown of the switching means without using a filter or the like. Consequently, it is possible to increase an efficiency, obtain an excellent stability and respondency and also increase an output.

BRIEF DESCRIPTION OF THE DRAWINGS

Other objects and advantages of the present invention will become apparent during the following discussion taken in conjunction with the accompanying drawings, in which.

DESCRIPTION OF THE PREFERRED EMBODIMENT

Figure 2A:
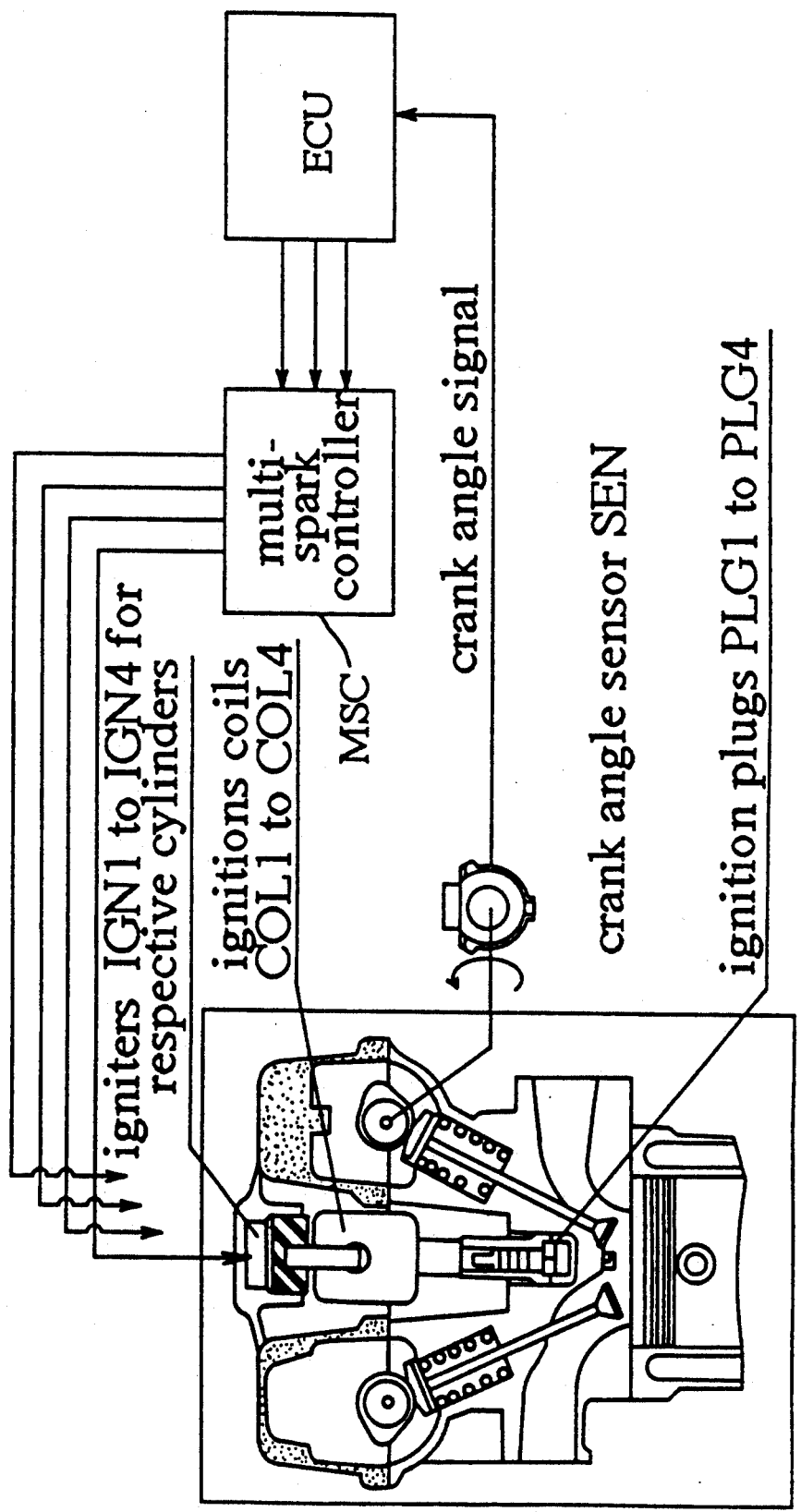
FIGS. 2a and 2b are block diagrams each schematically showing a construction of an ignition system to which the DC—DC converter depicted in FIG. 1a is applied.

A preferred embodiment of the present invention can be seen in an ignition system depicted in FIG. 2a. The present invention will hereinafter be described in due order with reference to the accompanying drawings.

(1) Outline of the ignition system

This type of ignition system for use with a four-cylinder engine consists of a crank angle sensor SEN, a microcomputer ECU, a multi-spark controller MSC, igniters IGN1 through IGN4 for the respective cylinders, ignition coils COL1 to COL4 and ignition plugs PLG1 to PLG4. (The numerals attached to IGN, COL and PLG imply that these components are provided on the four cylinders #1 to #4, and these numerals will hereinafter be omitted so far as the necessity does not arise particularly.)

The crank angle sensor SEN linked to a crank shaft of the engine detects a rotary angle of the crank shaft and transmits the detected angle to the microcomputer ECU. In response to this crank angle signal, the microcomputer ECU in turn generates an ignition timing signal IGT for setting a time for causing a spark and cylinder allocation signals SEL A and SEL B for specifying the cylinder in which the spark is generated, and imparts these signals to the multi-spark controller MSC. The multi-spark controller MSC behaves to generate high frequency spark pulses corresponding to the time set by the ignition timing signal IGT and then imparts the spark pulses to the igniters IGN of the cylinders specified by the cylinder allocation signals SEL A and SEL B. Upon the receiving the spark pulses the igniter IGN disconnects a primary current of the corresponding ignition coil COL. As a result of the disconnection of the primary current, the ignition coil COL generates a high voltage on the secondary side and applies the voltage to the corresponding ignition plug PLG. Note that the igniter IGN and the ignition coil COL are accommodated integrally in a plug cap for every cylinder.

(2) Multi-spark controller MSC

A. General Construction

Figure 2B:
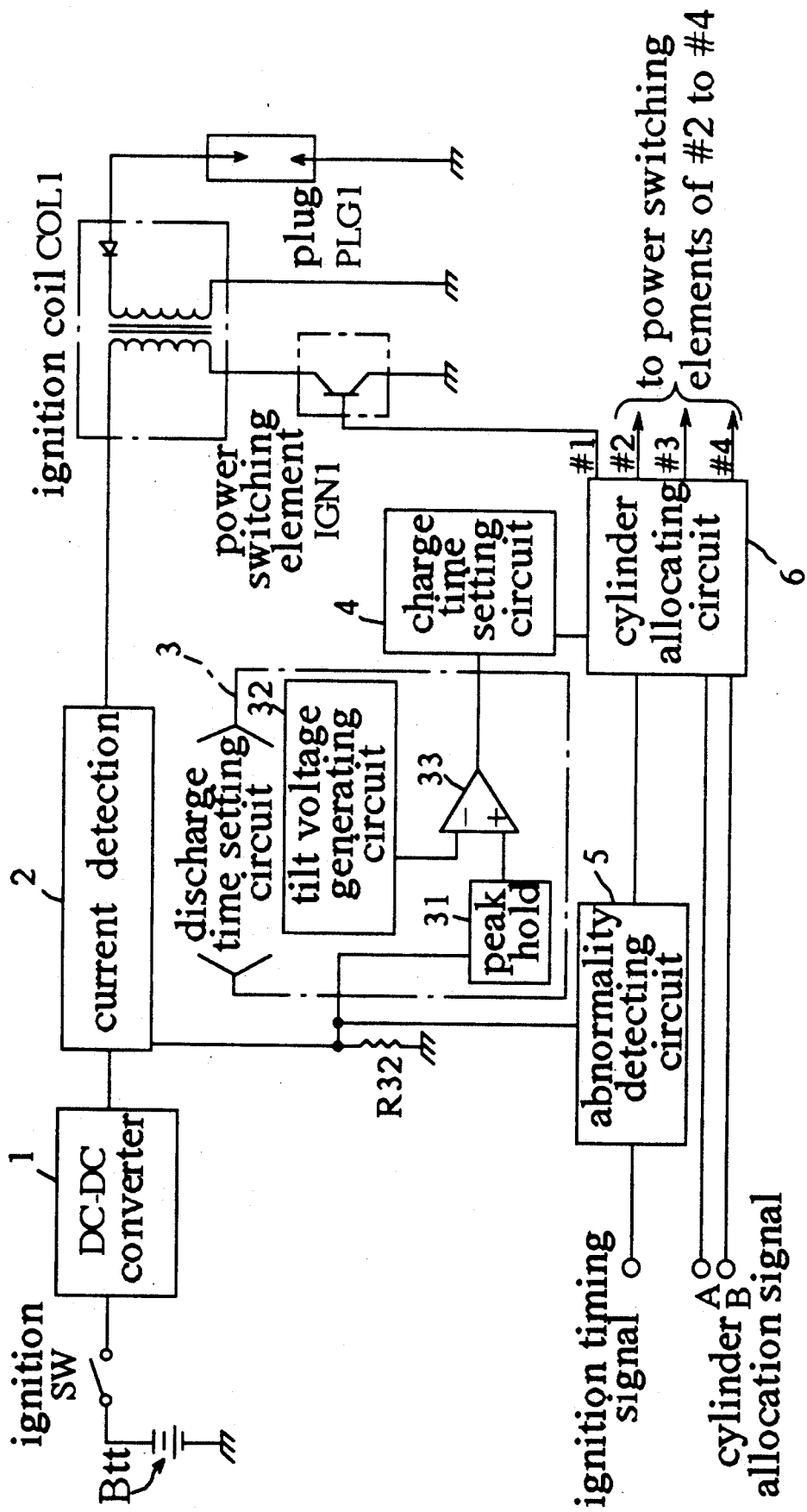

The multi-spark controller MSC is, as illustrated in FIG. 2b, composed of: a DC—DC converter 1 for generating constant voltages (5 V, 12 V and 100 V) from a voltage of 12 V of a battery Btt mounted on a vehicle; a current detecting circuit 2 for detecting a primary current of the ignition coil COL; a discharge time setting circuit 3 for setting a discharge time of the ignition coil COL; a charge time setting circuit 4 for setting a charge time of the ignition coil COL; an abnormality detecting circuit 5 for detecting an abnormality; and a cylinder allocation circuit 6 for allocating the spark pulses to the cylinders specified by the cylinder allocation signals SEL A and SEL B.

B. Outline of operation

Figure 3:
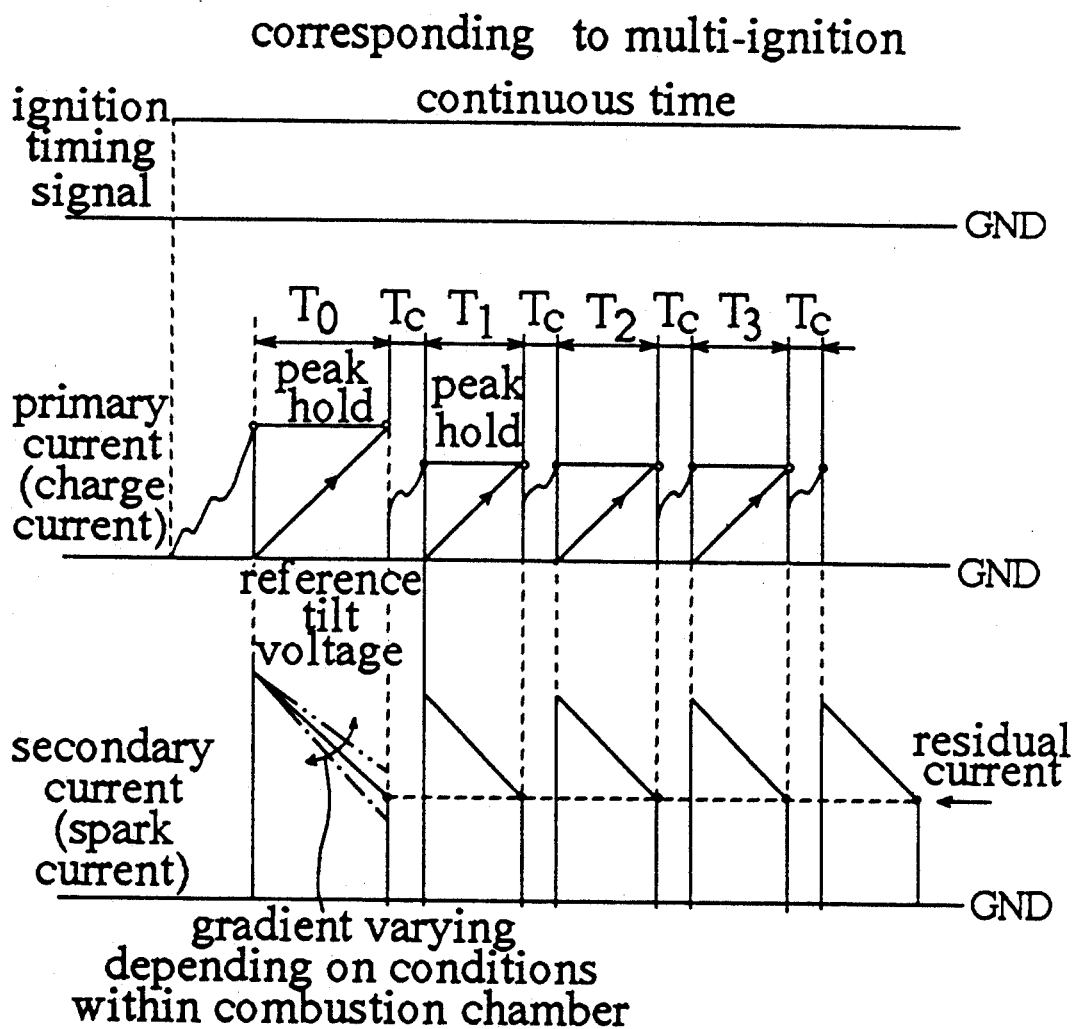
FIG. 3 is a diagram showing waveforms by way of an operating example of the ignition system illustrated in FIGS. 2a and 2b.

The operation will be explained in conjunction with a timing chart of FIG. 3.

The microcomputer ECU sets the ignition timing signal IGT at an L level in the case of setting an ignition. Whereas in the case of setting no ignition, the signal IGT is set at an H level. The ignition timing signal IGT is imparted via the abnormality detecting circuit 5 to the cylinder allocation circuit 6.

The cylinder allocation circuit 6 halts its operation during the L level of the ignition timing signal IGT but starts operating when it changes to the H level. The cylinder allocation circuit 6 ondrives the igniters IGN of the cylinders specified by the cylinder allocation signals SEL A and SEL B, thereby initiating the charge of the primary current immediately when a constant voltage of 100 V generated by the DC—DC converter 1 is impressed on the primary coil of the ignition coil COL. The primary current is detected by the current detecting circuit 2 and is then converted into a voltage value by means of a resistor R32. The voltage value is sent to a peak hold circuit 31 of the discharge time setting circuit 3 as well as to the abnormality detecting circuit.

The peak hold circuit 31 acts to hold a peak voltage generated in the resistor R32 while the primary current is flowing.

The abnormality detecting circuit 5 generally gives forth an H level output (a level at an input terminal of the cylinder allocation circuit 6). The circuit 5, however, changes the output to the L level when the primary current increases up to approximately 8A and holds it. As a result of this, the cylinder allocation circuit 6 ondrives the igniter IGN, while an tilt voltage generating circuit of the discharge time setting circuit 3 starts generating a reference tilt voltage which simply increases with a constant gradient.

The cylinder allocation circuit 6 ondrives the igniter IGN, at which time the energy charged in the primary coil of the ignition coil COL due to breaking of the primary current is instantaneously transferred to the second coil, thereby generating a high voltage on the secondary side. This high voltage is impressed on the ignition plug PLG, which in turn causes a spark discharge due to an insulating breakage.

On the other hand, the reference tilt voltage generated by the tilt voltage generating circuit 32 is given to a comparator 33, wherein the reference tilt voltage is compared with a hold voltage of the peak hold circuit 31. If the former is greater than the latter, the L level is outputted and given to the charge time setting circuit 4.

Upon receiving the input, the charge time setting circuit 4 changes the output to the L level for Tc sec (approximately 40 $\mu$sec). This output is, after being inverted, sent to the cylinder allocation circuit 6 and the tilt voltage generating circuit 32 as well. Subsequently, the cylinder allocation circuit 6 ondrives the igniter IGN, while the tilt voltage generating circuit 32 resets the reference tilt voltage.

As discussed above, the cylinder allocation circuit 6 continues to ondrive the igniter IGN. In the meantime, the primary current flows in the ignition coil COL, thus electrifying the primary current. A voltage (a voltage between terminals of the resistor R32) corresponding to the peak current for that period is held by the peak hold circuit 31.

After Tc sec has passed, the charge time setting circuit 4 changes the output to assume the H level, at which time the cylinder allocation circuit 6 offdrives the igniter IGN by dint of the inverted output. Then, the tilt voltage generating circuit 32 initiates generation of the reference tilt voltage, and hence the above-mentioned operations are repeated.

That is, immediately after the microcomputer ECU has set the ignition, the ignition coil COL is electrified till the primary current comes to approximately 8 A. A peak voltage equivalent to the primary current of about 8 A is held by the peak hold circuit 31. A discharge time of the ignition coil COL, i.e., a time for which the reference tilt voltage exceeds the peak voltage, becomes a constant value T0. An amount of energy consumed for this discharge differs depending on conditions of interior of a combustion chamber (a decreasing gradient of the secondary current varies). A residual current during a halt of the discharge becomes larger according as the energy consumed is reduced, and vice versa. The residual current becomes an increase starting value of the primary current when initiating the electrification. Hence, when the ignition coil COL is thereafter electrified for a constant time (Tc sec), a relatively high peak voltage is held by the peak hold circuit 31 in the case of the residual current being large. Whereas in the case of being small, a relatively low peak voltage is held by the circuit 31. The peak voltage serves to determine a subsequent discharge time (T1) of the ignition coil COL. If charge energy is large, the discharge time is set long, and vice versa. Therefore, while the microcomputer ECU sets the ignition, proper supply and ejection of the ignition energy are repeated at a high velocity.

The abnormality detecting circuit 5 judges that the ignition coil COL is short-circuited from the fact that the primary current comes to approximately 8 A within Ta1 sec since the microcomputer ECU has set the ignition. If the primary current reaches about 8 A even in excess of Ta2 sec, the circuit 5 judges that the ignition coil COL is disconnected, and forcibly stops the cylinder allocation circuit 6. (Ta1 is set to approximately 30 μsec, while Ta2 is set to about 300 μsec in this embodiment.)

C. Descriptions of the respective components

The respective components of the multi-spark controller 3 will be described with reference to FIGS. 1a and 4.

(A) DC—DC converter 1

Figure 1A:
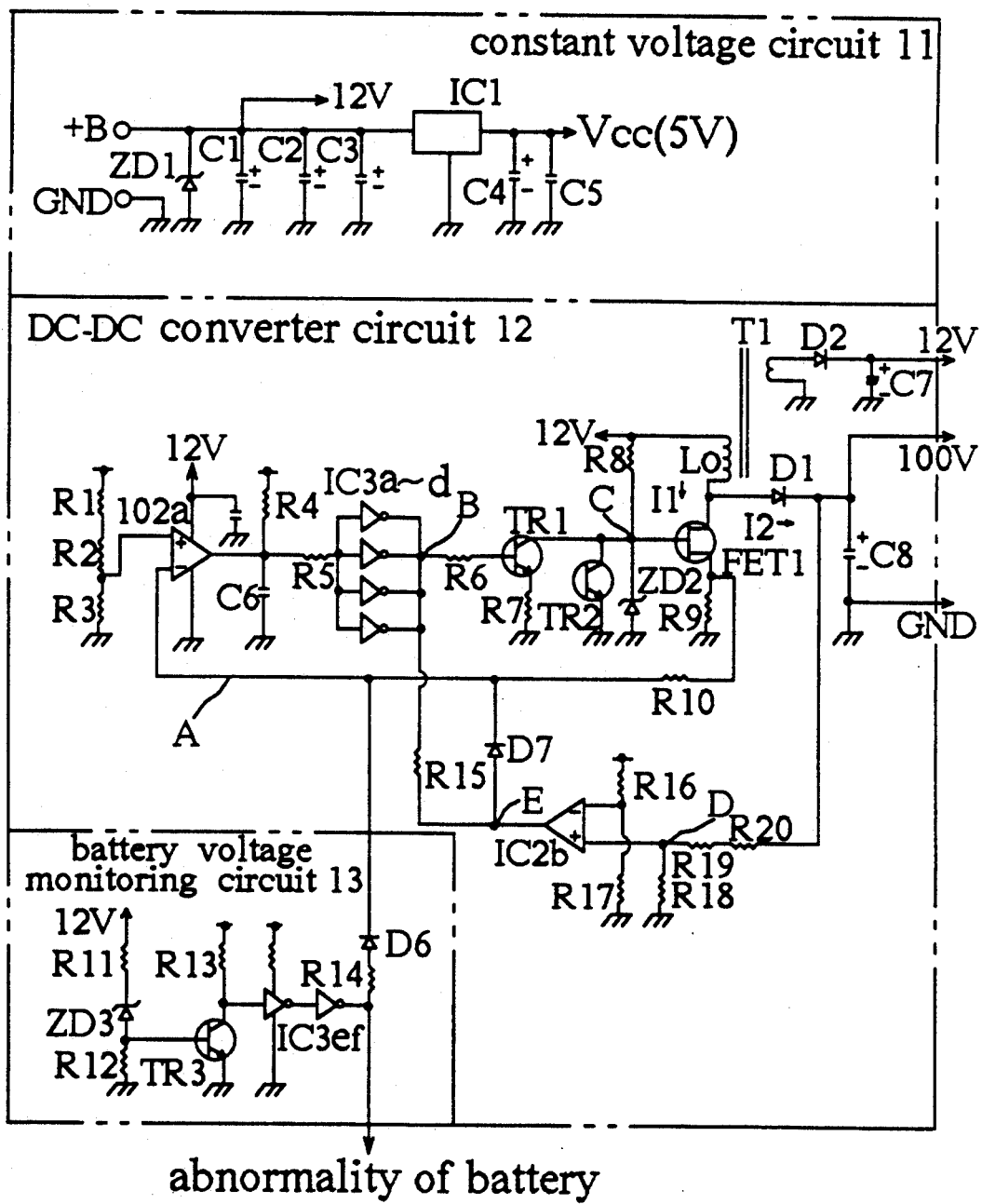
FIG. 1a is a circuit diagram fully depicting a construction of a DC—DC converter in an embodiment of the present invention.
Figure 1:
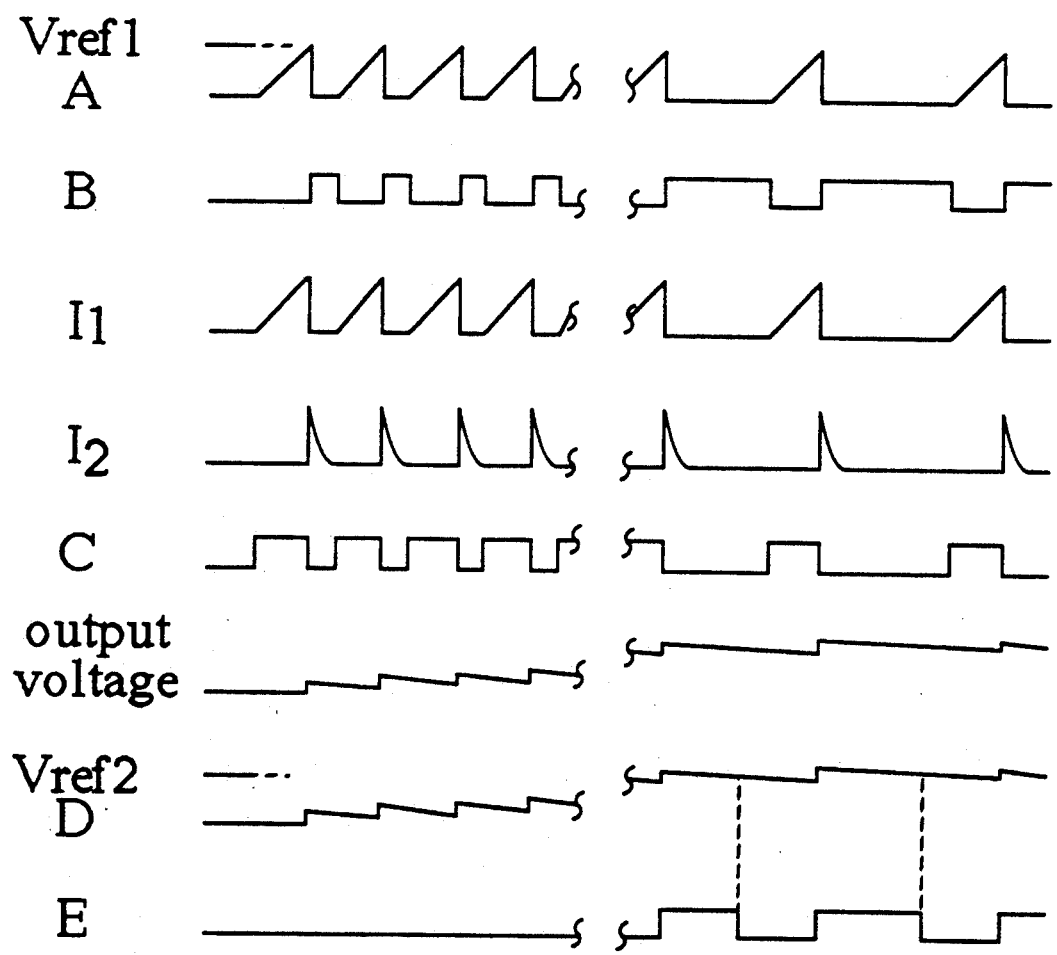
FIG. 1b is a diagram illustrating waveforms by way of an operating example.

The DC—DC converter 1 is, as depicted in FIG. 1a, constructed by a constant voltage circuit 11 for generating a constant voltage Vcc (5 V) from a voltage of 12 V of the battery Btt mounted on the vehicle; a DC—DC converter circuit 12 for generating stable voltages of 12 V and 100 V; and a battery monitoring circuit 13.

a. Constant voltage circuit 11:

The constant voltage circuit 11 functions to generate the constant voltages Vcc with the aid of a 3-terminal regulator IC1 and supplies the voltages to the individual components of the multi-spark controller 3. The constant voltage circuit 11 is known as an oft-employed circuit among those skilled in the art, and hence the description thereof is, it seems, unnecessary herein. Note that an illustration of a supplying line is omitted in FIG. 4 for simplicity.

b. DC—DC converter circuit 12

The DC—DC converter circuit 12 is, as illustrated in FIG. 1a, composed of: a transformer T1; an electric field effect transistor FET1; transistors TR1 and TR2; arithmetic amplifiers 102a and IC2b; an inverter; a diode; a resistor; and a capacitor. The function thereof will be explained in conjunction with FIG. 1b showing output waveforms of the respective components.

Now, the transistor FET1 is ondriven, a primary coil L0 of the transformer T1 is charged with a voltage of +12 V of the built-in battery Btt. At this time, a charge current i1 for electrifying the primary coil L0 is detected as an inter-terminal voltage (hereinafter be referred to as a feedback voltage) of a resistor R9 and applied to a minus terminal of the arithmetic amplifier 102a.

The arithmetic amplifier 102a, which constitutes a comparator, is intended to compare the feedback voltage with a reference voltage Vref1 set by resistors R1 to R3 and applied to a plus terminal. If the feedback voltage is smaller than the reference voltage, there is given forth an H level output. Whereas if larger than latter, an L level output is given forth. More specifically, when the feedback voltage exceeds the reference voltage Vref1 with a rise in the charge current i1, the arithmetic amplifier 102a gives forth the output assuming the L level, which is in turn inputted to an OFF timer consisting of a capacitor C6 and resistors R4 and R5. As a result, the OFF timer outputs L level pulses each having a predetermined width. The outputted pulses are inversely shaped by means of inverters IC3a to IC3d and applied to a base of an FET driver composed of the transistors TR1 and TR2.

The transistors TR1 and TR2 are turned ON when a base input assumes the H level and offdrives the electric field effect transistor FET1 by reducing a gate potential down to a ground level. When the transistor FET1 is turned OFF, the charge current i1 is cut off, as a result of which the energy charged in the primary coil L0 is discharged through the diode D1 while the capacitor C8 is charged with a current I2.

Since the feedback voltage is reduced down to the ground level due to offdriving of the transistor FET1, an output of the regulator IC1 is immediately changed to the H level. However, the OFF timer outputs the L level pulses having the predetermined width. Hence, the output pulses of the inverters IC3a to IC3d which have inversely shaped the L level pulses assume the H level. Meanwhile, the transistor FET1 continues to be offdriven. When being changed to the L level, however, the transistor FET1 is ondriven. Namely, there are caused oscillations with a setting time of the OFF timer serving as a cycle in a feedback loop, and electrification of the capacitor C8 which is based on the charge and discharge of the primary coil L0 is repeated, thereby gradually increasing a cathode potential of the diode D1.

Subsequently, the cathode potential of the diode D1 is divided by means of resistors R18 through R20, and the thus divided monitoring voltages are inputted to a plus terminal of the arithmetic amplifier IC2b. The arithmetic amplifier IC2b constituting a comparator works to compare the monitoring voltage with a reference voltage Vref2 set by resistors 16 and 17 which is applied to a minus terminal. If the former is lower than the latter, there is given forth an L level output. Whereas if larger than the latter, an open collector output takes place.

Output terminals of the arithmetic amplifier IC2b are connected via a resistor R15 to the outputs of the inverters IC3a through IC3d and via a diode D7 to the feedback loop of the oscillation circuit. Owing to these connections, when the output terminal of the amplifier IC2b is at the L level, the diode D7 is turned OFF irrespective of the outputs of the inverters IC3a through IC3d. In the case of being the open collector output, and when the outputs of the inverters IC3a through IC3d assume the L level, the diode D7 is turned ON. Immediately when turning ON the diode D7, the feedback voltage pseudo-increases, whereby the output of the arithmetic amplifier IC2b becomes the L level. Then, the OFF timer is retriggered, thereby extending a time for which the inverters IC3a to IC3d output the H level.

Even when a charge voltage of the capacitor C8, viz., a monitoring voltage corresponding to the output voltage, increases over the reference voltage Vref2, the electrification continues if the primary coil L0 is being electrified. Whereas during a discharging operation thereof, the discharge time is extended till the monitoring voltage decreases under the reference voltage Vref2. The output voltage can be kept to a constant value (100 V) by repeating such operations. A constant voltage (12 V) corresponding to a winding ratio is obtained on the secondary side of the transformer T1.

Under control over the output voltage which is carried out by means of the DC—DC converter circuit 12, an ON/OFF cycle of the transistor FET1 is invariably greater than a predetermined cycle, and there is no interruption in a linear region. It is therefore possible to prevent parasitic oscillations due to noise components and also an exothermic breakage associated with the transistor FET1. Consequently, the well-responding DC—DC converter, which requires no phase-shift compensating circuit, can be acquired.

C. Battery voltage monitoring circuit 13

The battery voltage monitoring circuit 13 consists of a transistor TR3, inverters IC3e and IC3f, a Zener diode ZD3, a diode D6 and resistors R11 to R14.

As illustrated in FIG. 1a, a cathode of the Zener diode ZD3 is connected via a resistor R11 to a 12 V-terminal of the built-in battery Btt, while anode thereof is connected to a base of the transistor TR3. A collector of the transistor TR3 is connected to input terminals of the inverters IC3e and IC3f which are connected in series. The inverters IC3e and IC3f are combined to constitute an I/O matching circuit of a high impedance, an output terminal of which is connected to a feedback loop of the DC—DC converter circuit 12 via a diode D6, a resistor 14 and a G2A terminal of a selector IC5 which will be mentioned later.

To be specific, when a voltage of the 12 V-terminal of the battery Btt exceeds a predetermined voltage, the transistor TR3 is turned ON, thereby outputting the L level from the inverter IC3f. If lower than the predetermined voltage, the transistor TR3 is turned OFF, with the result that the H level is outputted from the inverter IC3f.

When the inverter IC3f outputs the L level, no influence is exerted on the selector IC5 and on the DC—DC converter circuit 12. When the inverter IC3f output the H level, however, the selector IC5 ceases to operate, while the DC—DC converter circuit 12 acts to, as discussed above, extend a charge supply dormant time of the primary coil L0 because of a pseudo rise in the feedback voltage.

(B) Current detecting circuit 2

The current detecting circuit 2 is, as explained earlier, intended to detect a primary current for electrifying the primary coil of the ignition coil COL. The current detecting circuit 2 may be defined as a current mirror circuit composed chiefly of, as illustrated in FIG. 4, transistors TR4 and TR5. Flowed in a collector of the transistor TR4 is an electric current having a magnitude which is one-10,000th the primary current running through a resistor R21 in this current mirror circuit. A diode D8 and a resistor R32 are connected to a collector of the transistor Tr4 for the purpose of converting a current value into a voltage value.

(C) Discharge time setting circuit 3 a. Peak hold circuit 31

The peak hold circuit 31 is composed of a transistor TR7 and a capacitors C11 and C12. The capacitor C12 is interposed between an emitter of the transistor TR7 and the ground. The transistor TR7 charges the capacitor C12 with a current proportional to a terminal voltage of a resistor R32. At this time, the capacitor C11 functions to eliminate the noise components parasitic on the terminal voltage of the resistor R32.

It is to be noted that the capacitor C12 is discharged through a diode D9 when an ignition timing signal IGT assumes an L level and through a diode D10 when an arithmetic amplifier IC4c constituting a comparator 33 outputs the L level.

b. Tilt voltage generating circuit 32

The tilt voltage generating circuit 32 constructed of a transistor TR6, a resistor R25 and a capacitor C9. Based on this construction, when turning ON the transistor TR6, the capacitor C9 is discharged. When turning OFF the transistor Tr6, the capacitor C9 is electrified.

Figure 4:
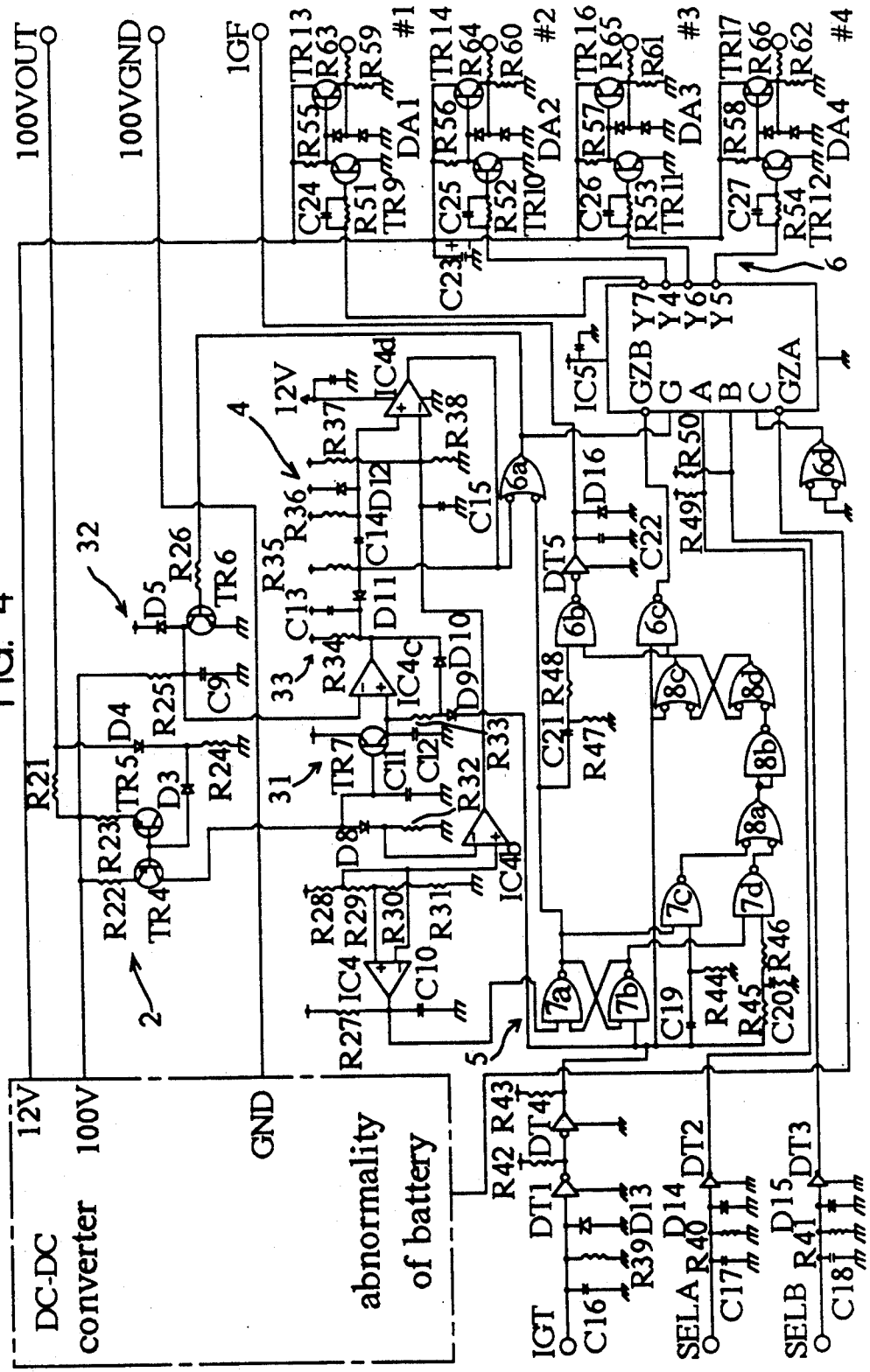
FIG. 4 is a circuit diagram illustrating a detailed constuction of a multi-spark controller MSC incorporated into the ignition system of FIGS. 2a and 2b.
Figure 5:
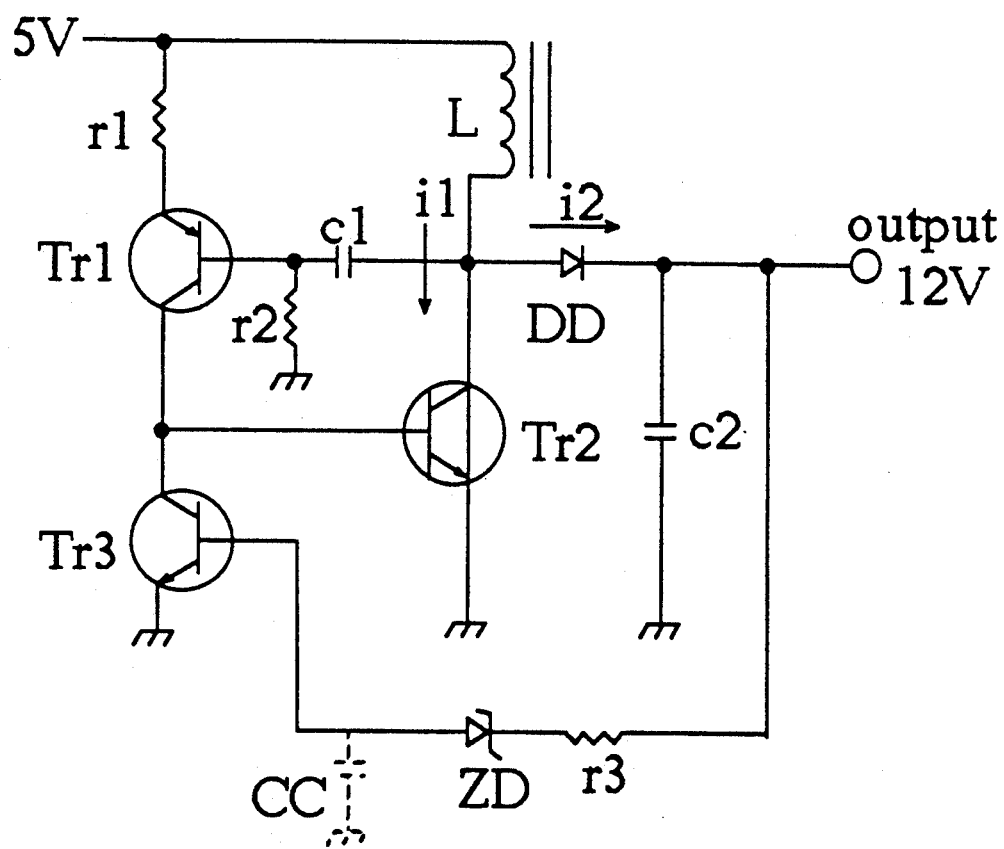
FIG. 5 is a circuit diagram showing a construction of a prior art DC—DC converter.

ON/OFF control of the transistor TR6 depends on the level of a signal applied to the base, i.e., the level of an output signal an OR gate IC6a (marked with the symbol 6a in FIG. 4. The representation is the same with others.) To be more specific, when an output of the OR gate IC6a assumes an H level, the capacitor C9 is discharged. Upon a change to the L level, the electrification starts.

In this embodiment, there is obtained a reference tilt voltage which simply increases with a constant gradient as an inter-terminal voltage of the capacitor C9 by utilizing a liner region of the capacitor C9.

b. Comparator 33

The comparator 33 is composed mainly of the arithmetic amplifier IC4c, a minus terminal of which receives the reference tilt voltage from the tilt voltage generating circuit 32. A hold voltage (an inter-terminal voltage of the capacitor C12) is imparted to a plus terminal thereof from the peak hold circuit 31. In this configuration, the amplifier IC4c outputs the H level when the reference tilt voltage is higher than the hold voltage. If lower than the hold voltage, the amplifier IC4c outputs the L level.

(D) Charge time setting circuit 4

The charge time setting circuit 4 includes a diode D11, a resistor R36, a capacitor C14 and an arithmetic amplifier IC4d.

The resistor R36 and the capacitor C14 are combined to form a differential circuit for differentiating a last transition edge of an output of the comparator 33 which is given via the diode D11 and applying the differential output to a plus terminal of the arithmetic amplifier IC4d. The arithmetic amplifier IC4d constituting a comparator compares the differential output with a reference value set by resistors R37 and R38 which is applied to a minus terminal thereof. If the differential output is lower than the reference value, the comparator outputs the L level. Whereas if larger than the latter, the H level is outputted.

That is, the arithmetic amplifier Ic4d outputs L level pulses each having a width enough to permit the differential output to increase above the set reference value after the output of the comparator 33 has changed to the L level. In accordance with this embodiment, this width is set to Tc sec (approximately 40 $\mu$ sec) by adjusting the reference value and a time constant of the differential circuit.

(E) Abnormality detecting circuit 5

The abnormality detecting circuit 5 composed of a multiplicity of ICs, a resistor and a capacitor. This circuit 5 has, as stated before, several functions, and hence the description will be given according to the respective functions.

a. Relay of ignition timing signal IGT

The ignition timing signal IGT is outputted from the microcomputer ECU and transmitted via inverters DT1 and DT4 to one input of a NAND gate IC6c. If the other input of the NAND gate IC6c assumes an H level, this gate becomes an inverter which in turn serves to invert the ignition timing signal IGT and applies it to a G2B terminal of a selector IC5. The selector IC5, as will be mentioned later, stops the operation when the H level is applied to the G2B terminal but starts operating when the L level is applied thereto.

When the primary current of 8A or greater flows within Ta1 sec after (setting the ignition) the microcomputer ECU changes the ignition timing signal to the H level, and if the primary current of less than 8A flows in excess of Ta2 sec, the other input of the NAND gate IC6c assumes the L level, thereby intercepting the ignition timing signal IGT. This situation will hereinafter be described.

b. Setting of initial charge

This function is to set the electrification of the primary coil of the ignition coil COL till the primary current reaches 8A just after the microcomputer ECU has changed the ignition timing signal IGT to the H level. This function is attained by a multi-vibrator consisting of NAND gates IC7a and IC7b and a comparator mainly composed of the arithmetic amplifier IC4a.

The comparator makes a comparison between the primary current detected as a terminal voltage of the resistor R32 and the reference voltage equivalent to the terminal voltage of the resistor R32 when the primary current is 8A, the reference voltage being set by resistors R28 through R31. If the primary current is lower than the reference voltage, the H level is outputted. Whereas if larger than the latter, the L level is outputted. This output is applied to a 13th pin of the multivibrator.

The multivibrator responds to the output of the comparator when the ignition timing signal IGT is at the L level. When the signal assumes the H level, the L level is outputted from an 11th pin, while the H level is outputted from a 10th pin. If the ignition timing signal IGT assumes the L level, the H level is outputted from the 11th pin, while the L level is outputted from the 10th pin. When the ignition timing signal IGT is at the L level, however, the comparator output assumes the H level because of no flow of the primary current. Therefore, it follows that the L level is outputted from the 11th pin, while the H level is outputted from the 10th pin. When the ignition timing signal IGT assumes the H level, there is developed a hold preparatory state in which, when the output of the comparator changes from the H level to the L level, the 11th pin output is changed from the L level to the H level, while the 10th pin output is varied from the H level to the L level, these outputs being then held.

The 11th pin output of the multivibrator is inputted to a 2nd pin of a negative logic OR gate IC6a. Given to a 1st pin of the OR gate IC6a is an output of the charge time setting circuit 4. When any of these outputs assumes the L level, the H level is outputted. When both of these output are at the H level, the L level is outputted. The H and L levels are imparted to a G terminal of the selector IC5 as well as to the tilt voltage generating circuit 32. As discussed above, the tilt voltage generating circuit 32 functions to discharge the capacitor C9 (resetting the reference tilt voltage) by the H level input and electrifies it by the L level input. In the selector IC5, as will be mentioned later, the igniter IGN is on-driven when an input of the G terminal is at the H level but is offdriven when the G terminal input is at the L level.

Namely, immediately after the ignition timing signal IGT changes from the L level to the H level, the L level is outputted from the 11th pin of the multivibrator, and hence the electrification of the primary coil of the ignition coil COL is initiated. Thereafter, when the charge current comes to 8A, the output of the comparator varies from the H level to the L level, with the result that the output of the 11th pin is changed to the H level and is then held. At this time, since the capacitor C14 of the charge time setting circuit 4 is sufficiently electrified, the output of the OR gate IC6a comes to assume the L level, thereby initiating both the discharge of the primary coil and the generation of the reference tilt voltage.

c. Detection of initial abnormality

This function is to detect an abnormal short-circuit of the ignition coil COL into which the primary current of more than 8A flows within Ta1 sec (approximately 30 μ sec) after changing the ignition timing signal IGT to the H level and also an abnormal disconnection of the ignition coil COL in which only the primary current of less than 8A flows even after Ta2 sec (about 300 μ sec) has passed, and to stop the discharge control. The former abnormality is detected by a capacitor C19, a resistor R44 and a NAND gate IC7c, while the latter is detected by a capacitor C20, resistor R45 and R46 and a NAND gate IC7d.

A capacitor C19 cooperates with a resistor R 44 to constitute a differential circuit for outputting H level pulses each having a width equivalent to Ta1 sec when changing the ignition timing signal IGT to the H level and sending the pulses to a 6th pin of the NAND gate IC7c. Imparted to a 5th pin of the NAND gate IC7c is a 11th pin output of a multivibrator constructed of NAND gates IC7a and IC7b. When the 11th pin output of the multivibrator assumes the H level in the case of an inflow of the primary current of greater than 8A with Ta1 sec after the ignition timing signal IGT has changed to the H level, the output thereof is varied to the L level.

The capacitor C20 and the resistors R45 and R46 are combined to shape an integrating circuit for outputting H level pulses which rise after Ta2 sec has passed in the case of changing the ignition timing signal IGT to the H level and transmitting the pulses to a 1st pin of the NAND gate IC7d. A 10th pin output of the multivibrator is imparted to a 2nd pin of the NAND gate IC7d. The primary current of more than 8A does not flow even after Ta2 sec has passed since the ignition timing signal IGT was changed to the H level. Hence, if the 10th pin output of the multivibrator remains at the H level, the output thereof is varied to the H level.

Outputs of the NAND gates IC7c and IC7d are synthesized by means of a negative logic OR gate IC8a, and the synthesized output is then inverted by the NAND gate IC8b. The thus inverted output is given to the 5th pin of the multivibrator constructed of negative logic OR gates IC8c and IC8d. The multivibrator is brought into a hold preparatory state on the occasion of a 9th pin input, i.e., when the ignition timing signal IGT is at the H level. The multivibrator holds this state till the ignition timing signal IGT assumes the L level once again after changing the 10th pin output to the L level immediately when the 5th pin input becomes the L level. The 10th pin output is held at the L level, thereby hindering a relay of the ignition timing signal by the NAND gate IC6c. Subsequent to this step, the H level is applied to the G2B terminal of the selector IC5 (stoppage of operation).

The 10th pin output of the multivibrator composed of the OR gates IC8c and IC8d is transmitted to an outside control circuit via a NAND gate IC6b and an inverter DT5. The explanation of this operation is omitted herein.

d. Detection of abnormal current

As discussed above, the residual current after the spark discharge has taken place differs depending on conditions within the cylinders. To describe it in greater detail, when an energy consumption is quite small, the residual current becomes abnormally large. In some cases, overcharging takes place when effecting the charge for a time of Tc set by the charge time setting circuit 4. To cope with this, there is invested a function to forcibly reduce the charge time by detecting an overcurrent. This function is attained by an arithmetic amplifier IC4b and a capacitor C15.

The arithmetic amplifier IC4b constitutes a comparator for comparing a terminal voltage of a resistor R32 with a reference value for detecting the over-current which is set by the resistors R28 through R31. If the terminal voltage is less than the reference value, an open collector output is effected. Whereas if more than the latter, the L level is outputted. Namely, when the terminal voltage of the resistor R32 exceeds the reference value for detecting the over-current, the L level is outputted from the arithmetic amplifier IC4b, thereby discharging the capacitor C15. Therefore, the reference value for setting the charge time inputted to the charge time setting circuit 4 is set lower than a constant time, whereby the charge time of the primary coil increases to prevent overcharging.

(F) Cylinder allocation circuit 6

The cylinder allocation circuit 6 is composed of the selector IC5 and an igniter driver consisting of transistors TR9 to TR17.

The selector IC5 includes control terminals G2A and G2B, an input terminal G, select input termianls A to C and output terminals Y4 to Y7. As explained earlier, the output of the battery voltage monitoring circuit 13 (see FIG. 4a) is given to the control terminal G2a, while the output of the NAND gate IC6c is imparted to the control terminal G2B. The output of the OR gate IC6a is sent to the input terminal G. The cylinder allocation signals SEL A and SEL B are transmitted from the microcomputer EUC via the inverters DT2 and DT3 to the selected input terminals A and B. The select input terminal C is fixed at the H level.

As will be clarified from the description given above, this selector is operable when the control terminal G2A and G2B are at the L level, viz., when the battery voltage is normal; the ignition timing signal IGT assumes the H level; and there is no abnormality caused by short-circuiting of the ignition coil COL and by disconnection thereof. In this state, the output terminals are selected as shown in the following Table 1 in accordance with the cylinder allocation signals SEL A and SEL B. Then, outputting is performed after inverting the input of the input terminal G.

TABLE 1

| SEL A | SEL B | Selected terminal |
|-------|-------|-------------------|
| H     | H     | Y4                |
| L     | H     | Y5                |
| H     | L     | Y6                |
| L     | L     | Y7                |

The igniter driver is composed of four sets of driving circuit connected to the output terminals Y4 through Y7, respectively. These driving circuits are well known to those skilled in the art, so that the necessity for explaining them will not arise herein.

As discussed above, the DC voltage converting device according to the present invention comprises: a choke coil; a switching means for supplying/breaking a charge current of the choke coil; a capacitor for accumulating electric energy discharged from the choke coil; an inhibition setting means for setting an inhibition of charging when a voltage of the capacitor is greater than a predetermined voltage and releasing the inhibition when being lower than the predetermined voltage; a current detecting means for detecting a charge current of the choke coil; a charge/discharge setting means for setting a discharge of the choke coil when the charge current reaches a predetermined value, setting a charge of the choke coil after a predetermined time has passed if the inhibition of charging is thereafter released until the predetermined time passes, and setting the charge of the choke coil at least after releasing the inhibition of charging if the charging inhibition has been set; and a driving means for conductively energizing the switching means during setting of charge and deenergizing the switching means during setting of discharge. When the capacitor voltage increases above the predetermined voltage, only the time for interrupting the electrification is extended. That is, the ON/OFF cycle of the switching means is invariably larger than the constant cycle. Since there is no interruption of the oscillations in the linear region of the switching means, it is possible to prevent the parasitic oscillations caused by the noise components and heat emission or heat breakage of the switching means without employing the filter. Hence, there is attained the device which exhibits a high efficiency and excellent stability and respondency and is, as described in the embodiment, capable of obtaining the high output.

Although the illustrative embodiment has been described in detail with reference to the accompanying drawings, it is to be understood that the present invention is not limited to this precise embodiment. A variety of modifications or changes may be effected therein by one skilled in the art without departing from the scope or spirit of the invention.

What is claimed is:

1. A DC voltage converting device comprising:
   a choke coil;
   a switching means for selectively supplying a charge current of said choke coil;
   a capacitor for accumulating electric energy discharged from said choke coil;
   an inhibition setting means for setting an inhibition mode which inhibits charging of said capacitor when a voltage of said capacitor is greater than a predetermined voltage, and for releasing the inhibition mode when the voltage of said capacitor is lower than said predetermined voltage;
   a current detecting means for detecting a charge current of said choke coil;
   a charge and discharge setting means for setting a discharge mode for discharge of said choke coil when said charge current reaches a predetermined value, for setting a charge mode for charging said choke coil after a predetermined time has passed if the inhibition mode is released during said predetermined time, and for setting the charge mode at least after releasing the set inhibition mode; and
   a driving means for conductively energizing said switching means during the charge mode, and for deenergizing said switching means during the discharge mode.

* * * * *